(12) United States Patent
Aaron et al.

(10) Patent No.: US 8,528,575 B2
(45) Date of Patent: Sep. 10, 2013

(54) DEBRIS COLLECTION APPARATUS AND METHOD FOR COLLECTING DEBRIS FROM A DATA STORAGE LIBRARY

(75) Inventors: Robert C. Aaron, Boise, ID (US); John D. Hampton, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2414 days.

(21) Appl. No.: 11/242,203

(22) Filed: Oct. 3, 2005

(65) Prior Publication Data

US 2007/0074740 A1 Apr. 5, 2007

(51) Int. Cl.
*B08B 3/04* (2006.01)

(52) U.S. Cl.
USPC ........................................ 134/104.2; 360/132

(58) Field of Classification Search
None
See application file for complete search history.

(56) References Cited

U.S. PATENT DOCUMENTS

| 4,284,681 | A | | 8/1981 | Tidmarsh et al. |
| 4,521,553 | A | | 6/1985 | Fitton et al. |
| 5,029,026 | A | * | 7/1991 | Stefansky et al. .......... 360/97.02 |
| 6,067,212 | A | * | 5/2000 | Poorman ........................ 360/128 |
| 6,243,350 | B1 | * | 6/2001 | Knight et al. .................. 369/126 |
| 2004/0042121 | A1 | * | 3/2004 | Davis ............................ 360/128 |

* cited by examiner

*Primary Examiner* — Eric Golightly

(57) ABSTRACT

Debris collection apparatus includes a housing that substantially conforms to a dimensional standard for a specified type of data cartridge. A debris attractant operatively associated with a surface of the housing attracts and holds debris from a region to be cleaned.

15 Claims, 4 Drawing Sheets

DEBRIS COLLECTION APPARATUS AND METHOD FOR COLLECTING DEBRIS FROM A DATA STORAGE LIBRARY

BACKGROUND

Data storage libraries are well-known in the art and are widely used to store and retrieve large amounts of data. A typical data storage library contains a number of data cartridge storage locations as well as one or more cartridge read/write drives that are used to read data from and/or write data to data cartridges stored within the library. A robotic cartridge access system is commonly used to move the data cartridges between the cartridge storage locations and the cartridge read/write drives.

One problem with data storage libraries relates to the gradual accumulation of dirt and debris on the various internal components of the library. Over time, the accumulation of dirt and debris can interfere with the operation of the various components and systems of the data storage library. Such data storage libraries should be periodically removed from service and cleaned in order to prolong the life of the data storage library and to avoid malfunction.

BRIEF DESCRIPTION OF THE DRAWINGS

Illustrative and presently preferred exemplary embodiments of the invention are shown in the drawings in which.

DETAILED DESCRIPTION

Figure 1:
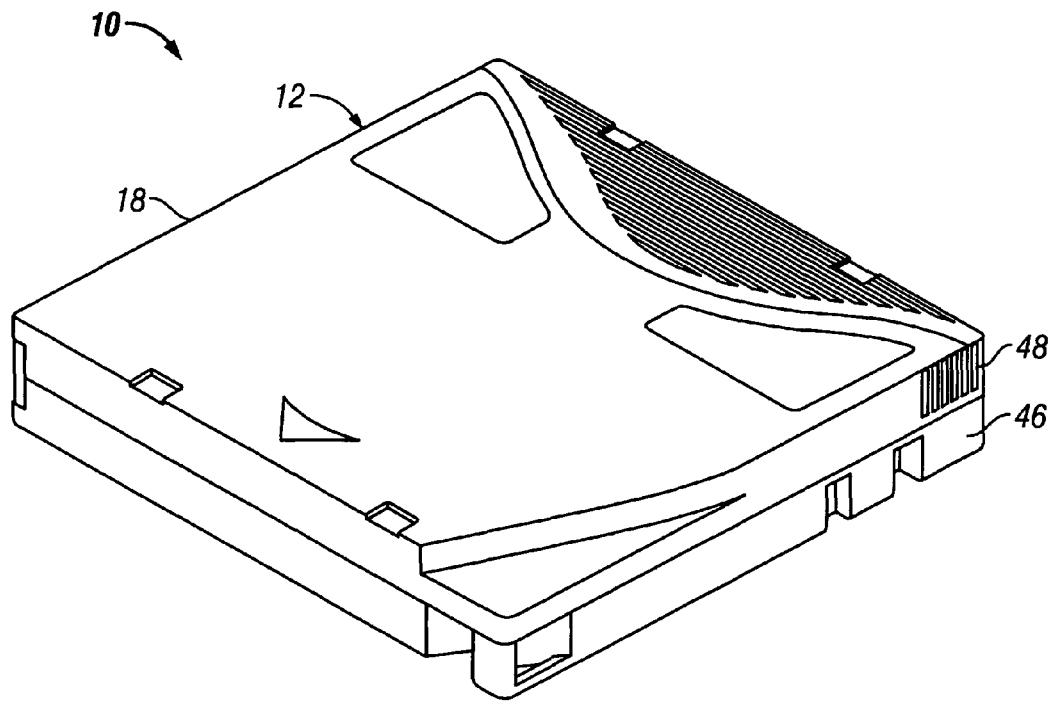
FIG. 1 is a perspective view of one embodiment of debris collecting apparatus.

One embodiment of debris collection apparatus 10 is illustrated in FIG. 1, and may comprise a housing 12 sized or configured so that it substantially conforms to a dimensional standard for a specified type of data cartridge. For example, in one embodiment the housing 12 may substantially conform to the dimensional standard for a linear-tape-open (LTO) type of data cartridge 14 (FIG. 2), although the housing 12 may be made to conform to other dimensional standards as well. Accordingly, and as will be described in greater detail herein, the debris collection apparatus 10 may be used to remove debris from a data storage library 16 (FIG. 2), although other uses are possible.

The housing 12 of debris collection apparatus 10 is provided with one or more debris attractants 18 which attract and hold debris. The debris attractants 18 may comprise any of a wide range of materials and devices useful for attracting and holding any of a wide variety of debris types desired to be collected. For example, in the embodiments shown and described herein, the various types of debris attractants 18 may be categorized as magnetic, displacement, electrostatic, and contact/adhesion type debris attractants, although other classifications and/or types of debris attractants are possible.

Magnetic type debris attractants 18 attract or collect magnetic debris, such as particles of ferromagnetic materials. In the embodiments shown and described herein, suitable magnetic type debris attractants may comprise one or more permanent magnets 20. See FIG. 3.

Figure 4:
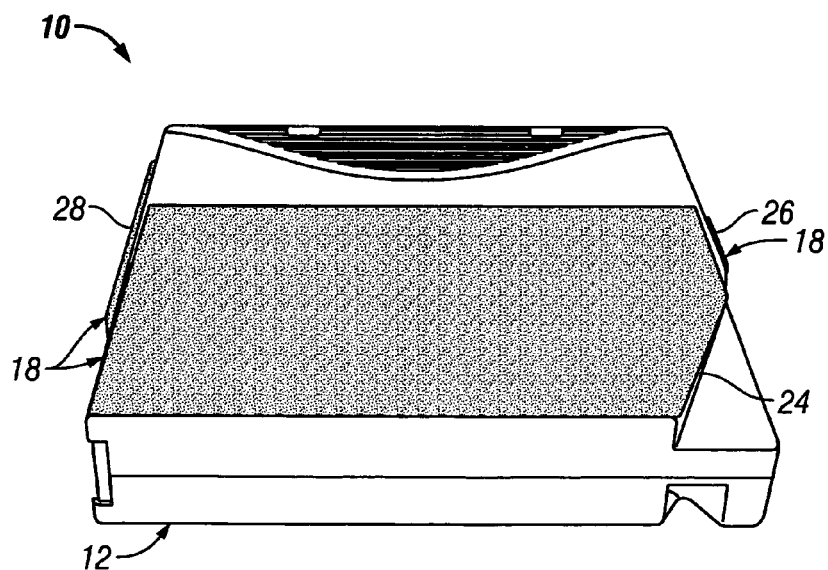
FIG. 4 is a perspective view of an embodiment of debris collecting apparatus with felt displacement material.
Figure 5:
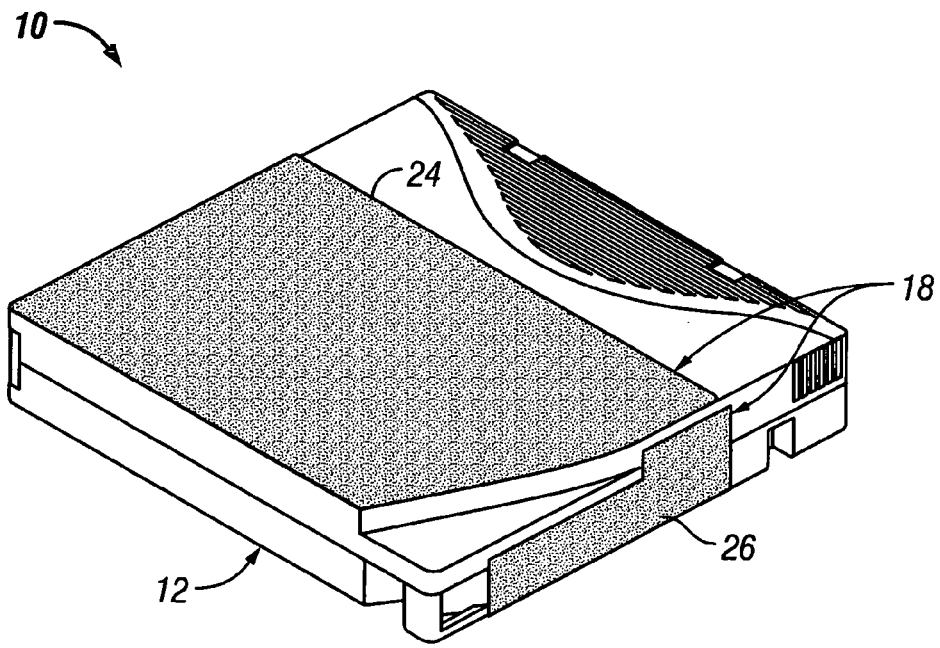
FIG. 5 is a perspective view of an embodiment of debris collecting apparatus with bristle displacement material.
Figure 6:
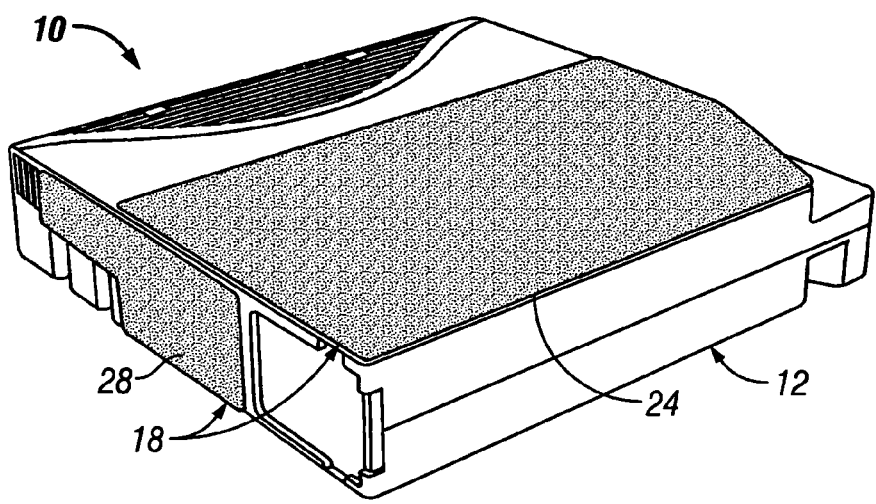
FIG. 6 is a perspective view of an embodiment of debris collecting apparatus with fabric displacement material.

Displacement type debris attractants 18 are illustrated in FIGS. 4-6 and attract and hold debris primarily by displacing, i.e., removing, debris from surfaces by means of physical contact. In the embodiments shown and described herein, displacement type debris attractants 18 may comprise any of a wide variety of displacement materials 22, such as, for example, felt 24 (FIG. 4), bristles 26 (FIG. 5), fabric 28 (FIG. 6), and various combinations thereof. Displacement type debris attractants 18 are capable of removing a wide variety of debris types, including magnetic and non-magnetic debris.

Electrostatic debris attractants 18 attract and hold debris by electrostatic charge. For example, and as will be described in greater detail below, a positive electrostatic charge placed on the debris collection apparatus 10 will attract negatively-charged debris. Conversely, a negative electrostatic charge will attract debris having positive electrostatic charges.

Contact/adhesion type debris attractants 18 collect and hold debris coming into physical contact with the debris attractant 18. One type of contact/adhesion debris attractant 18 may comprise a polymeric material having a high surface energy associated with van der Waals forces. The high surface energy enables the polymeric material to attract and hold a wide range of debris, including dust and other fine particles. The contact/adhesion debris attractant 18 may comprise a portion of the debris collection apparatus 10. Alternatively, the entire housing 12 of debris collection apparatus 10 may be fabricated from such a material, in which case substantially the entirety of the debris collection apparatus 10 will comprise the contact/adhesion type debris attractant 18.

Figure 3:
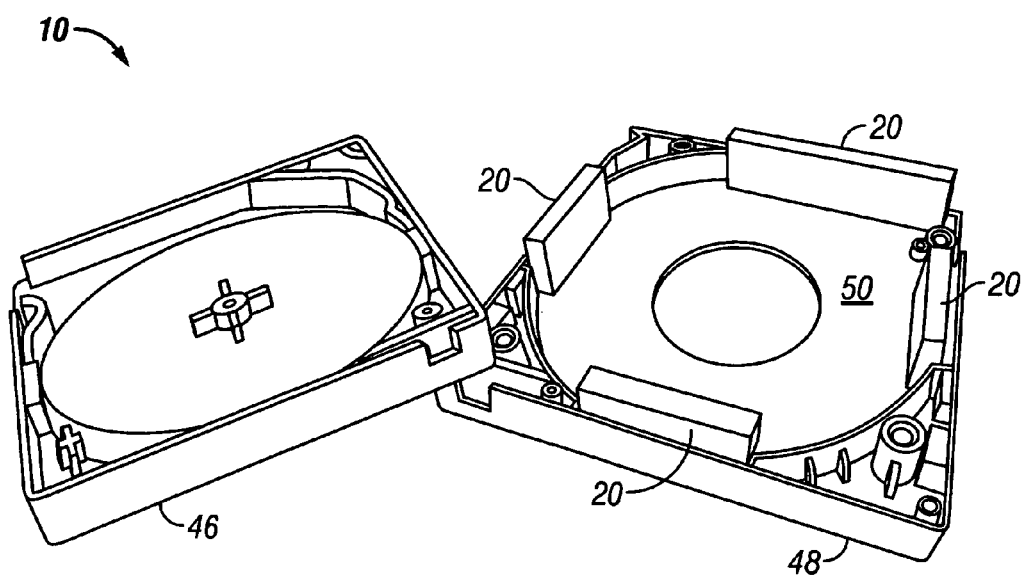
FIG. 3 is a perspective view of an embodiment of debris collecting apparatus showing an arrangement of permanent magnets within an interior region of the housing.

The various types debris attractants 18 may be used alone or in various combinations in order to provide the debris collection apparatus 10 with the ability to attract and hold various types of debris. For example, one embodiment of a debris collection apparatus 10 may comprise a housing 12 formed from a high surface energy polymeric material. To such a housing 12 may be added one or more magnetic attractants 18, such as permanent magnets 20, as best seen in FIG. 3. The resulting debris collection apparatus 10 would therefore comprise two different types of debris attractants: Contact/adhesion and magnetic. Additional debris attractants 18, such as displacement type debris attractants 18 comprising one or more displacement materials 20, could also be added. See FIGS. 4-6. In addition, the housing 12 may be provided with an electrostatic charge (either positive or negative) to attract debris having the opposite charge. Alternatively, if it is not possible to provide the housing 12 with an electrostatic charge, one or more regions of the housing 12 may be provided with electrostatically-chargeable materials (e.g., non-electrically conductive plastics), which may then be provided with a suitable electrostatic charge.

It should be noted that it is not necessary to provide a single debris collection apparatus 10 with all of the various types of debris attractants 18, or even a combination of any two or more types of debris attractants 18. For example, in other embodiments, debris collection apparatus 10 may be provided with only a single type of debris attractant 18. Accordingly, each such debris collection apparatus 10 could be customized or "tuned" to provide a specific type of debris collection ability.

Figure 2:
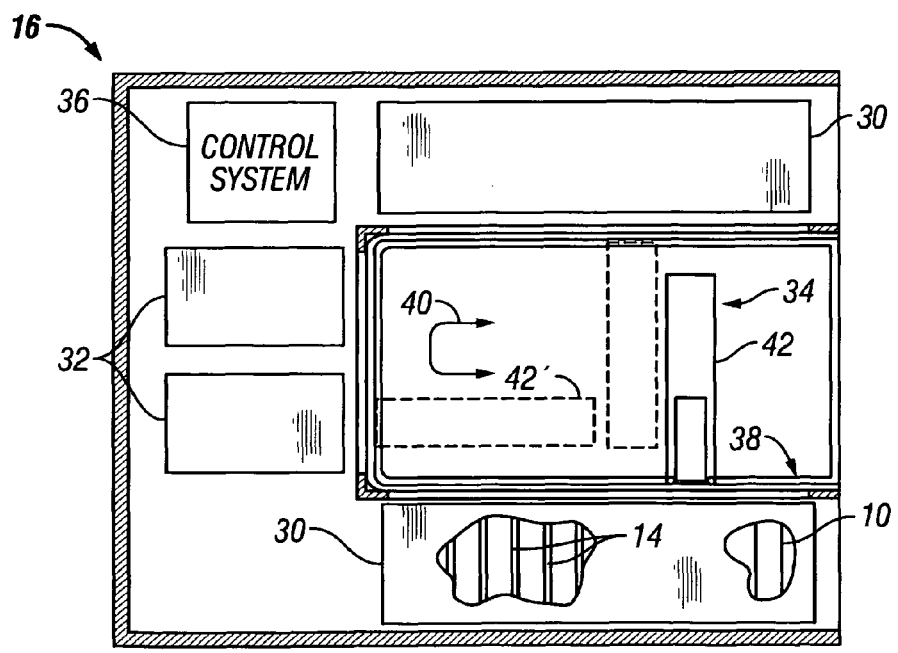
FIG. 2 is a schematic representation of a data storage library in which may be used the debris collecting apparatus.

Referring now primarily to FIG. 2, the debris collection apparatus 10 may be used to collect and remove debris from a data storage library 16. In one embodiment, data storage library 16 may comprise a plurality of cartridge holding locations 30 and cartridge read/write devices 32 arranged in a generally U-shaped configuration, although other configurations are possible. The data storage library 16 may also include a cartridge access system 34 that can be operated to retrieve and transport data cartridges 14 between the cartridge holding locations 30 and the cartridge read/write devices 32.

As an illustration of one exemplary use of the data storage library 16, a host computer (not shown) may issue a request to access a data cartridge 14 stored in one of the cartridge holding locations 30 to read and/or write data thereto. In response, a control system 36 causes the cartridge access system 34 to be moved along a positioning system 38, i.e., in the directions of arrows 40, until the cartridge access system 34 is positioned adjacent the requested data cartridge 14 (e.g., at position 42). Once positioned, the control system 36 signals the cartridge access system 34 to withdraw the data cartridge 14 from the cartridge holding location 30. The control system 36 then instructs the cartridge access system 34 to move along the positioning system 38 until the cartridge access system 34 is adjacent the appropriate cartridge read/write device 32 (e.g., at position 42'). The data cartridge 14 is then loaded into the cartridge read/write device 32 for a data read/write operation.

Over time, the various internal areas and components of the data storage library 16 tend to accumulate debris. Such debris may include wear particles (e.g., magnetic and non-magnetic particles) from the various systems and components comprising the data storage library 16, as well as debris (e.g., dust) from various environmental or atmospheric sources. The debris collection apparatus 10 may be used to collect and remove such accumulated debris.

In one embodiment, the debris collection apparatus 10 is provided to the data storage library 16. Because the debris collection apparatus 10 is sized to substantially conform to a dimensional standard for a data cartridge (e.g., 14) utilized by the data storage library 16, the debris collection apparatus 10 may be utilized by the data storage library 16 as if it were a data cartridge 14. Thus, the cartridge access system 34 may engage the debris collection apparatus 10 and move it within the interior region of the data storage library 16 in a manner akin to that of a conventional data cartridge 14. As it is moved about within the data storage library 16, the debris collection apparatus 10 collects and holds debris from the various internal areas and components of the data storage library 16.

For example, in one embodiment wherein the debris collection apparatus 10 is provided with a contact/adhesive type debris attractant 18, such as, for example, if the housing 12 is fabricated from a high surface energy polymeric material, the debris collection apparatus 10 will tend to attract and hold debris coming into contact with the debris attractant 18. Thus, the debris collection apparatus 10 will remove debris from the cartridge access system 34, as well as any cartridge holding locations 30 in which will be inserted the debris collection apparatus 10. Similarly, the debris collection apparatus 10 will collect and remove debris from any cartridge read/write devices 32 into which the debris collection apparatus 10 may be inserted.

Additional debris collection can be achieved by providing the debris collection apparatus 10 with other types of debris attractants 18. For example, magnetic type debris attractants 18, such as one or more permanent magnets 20 (FIG. 3), will allow the debris collection apparatus 10 to collect and hold magnetic debris from regions in proximity to the debris collection apparatus 10. Electrostatically-charged debris can be collected by placing an electrostatic charge or charges on electrostatic debris attractants 18 which may be provided on the debris collection apparatus 10. Similarly, displacement material 22 (FIGS. 4-6) provided on the debris collection apparatus 10 will provide enhanced cleaning (i.e., of debris removal) of surfaces and objects that may be contacted by the displacement material 22 as the debris collection apparatus 10 is moved about within the data storage library 16. In this regard, the proper placement of displacement material 22 on the debris collection apparatus 10 can be used to provide enhanced cleaning of certain portions of the library storage system 16, such as, for example the cartridge engaging mechanism (not shown) provided on the cartridge access system 34. After cleaning, the debris collection apparatus 10 may be removed from the data storage library 16. Thereafter, the various debris attractants 18 provided thereon may be cleaned and/or rejuvenated as necessary. The debris collection apparatus 10 may then be reused.

Having briefly described the debris collection apparatus 10 according to the teachings provided herein, as well as some of its more significant features and advantages, various exemplary embodiments and various of debris collection apparatus 10 will now be described in detail.

However, before proceeding with the detailed description, it should be noted that the various embodiments shown and described herein are illustrative only, and various changes and modifications to the apparatus, systems, and methods shown and described herein may be resorted to without departing from the scope of the present invention. For example, in the embodiments shown and described herein, the debris collection apparatus 10 substantially conforms to the dimensional standard for an LTO type of data cartridge. However, other dimensional standards, such as the DLT dimensional standard, may also be used. In addition, various types of debris attractants 18 are shown and described herein as comprising certain exemplary materials provided at certain exemplary locations. However, other materials and locations could also be used, as would become apparent to persons having ordinary skill in the art after having become familiar with the teachings provided herein. In addition, the debris collection apparatus 10 could be used in accordance with other types of systems and in accordance with other types of cleaning regimens besides those shown and described herein. Accordingly, the present invention should not be regarded as limited to the particular apparatus, configurations, devices, and methods shown and described herein.

Referring back now to FIG. 1, one embodiment of debris collection apparatus 10 may comprise a housing 12 sized or configured so that it substantially conforms to a dimensional standard for a specified type of data cartridge. So configuring the housing 12 will allow the debris collection apparatus to be utilized in a data storage library 16 (FIG. 2) configured to operate with data cartridges 14 that conform to the dimensional standard. By way of example, in the embodiments shown and described herein, the housing 12 is sized to substantially conform to the dimensional standard for linear-tape-open (LTO) data cartridges. Alternatively, the housing 12 may be sized to substantially conform to the dimensional standard for digital-linear-tape (DLT) data cartridges. Still other types of dimensional standards currently known in the art or that may be developed in the future could be used as well. Accordingly, the debris collection apparatus 10 should not be regarded as limited to any particular type or types of dimensional standards.

Before proceeding, it should be noted that most of the data cartridge types currently used by data storage libraries are provided with some type of cartridge identifier system. The cartridge identifier system allows at least a part of the library storage system (e.g., the cartridge read/write device) to ascertain certain information about the type of data cartridge. For example, LTO data cartridges are provided with a cartridge identifier system that comprises an RFID (radio-frequency identification) system. When queried by a radio-frequency (RF) interrogation signal, the system responds with certain information about the data cartridge. Another type of cartridge identifier systems utilizes a machine-readable code (e.g., bar code label) that may be provided on the data cartridge.

Accordingly, it will usually be desired (but not required) to provide the debris collection apparatus 10 with a cartridge identifier system that will allow the debris collection apparatus 10 to be so identified by the data storage library and/or individual sub-systems (e.g., the cartridge read/write device) comprising the data storage library. As will be described in greater detail below, the ability of the data storage library and/or individual sub-systems of the data storage library to identify the debris collection apparatus 10 may be helpful in developing a suitable cleaning procedure or otherwise streamlining the cleaning procedure.

Continuing now with the description, in one embodiment, the housing 12 may comprise a two-piece structure comprising opposing halves 46 and 48 that are joined together to form the housing 12. See FIGS. 1 and 3. The two halves 46 and 48 may comprise generally shell-like structures which together define a generally hollow interior region 50, as best seen in FIG. 3. Alternatively, other structural configurations are possible. The two halves 46 and 48 comprising housing 12 may be manufactured from any of a wide range of materials depending on the characteristics that the housing 12 is to have. For example, and as will be described in greater detail herein, in one embodiment, the two halves 46 and 48 of housing 12 are made from a polymeric material having a high surface energy. Such a material will allow the housing 12 to function as a contact/adhesion type debris attractant 18. Alternatively, the two halves 46 and 48 of housing 12 may be made from a non-electrically conductive material, such as polystyrene, that will accept and hold an electrostatic charge. This type of material will allow the housing to function as an electrostatic type debris attractant 18 when an electrostatic charge is placed thereon.

Regardless of whether the material used to form the housing 12 will allow the housing 12 itself to function as a debris attractant (in the manner described above), the housing 12 of debris collection apparatus 10 may be provided with one or more debris attractants 18 which attract or collect and hold debris. The debris attractants 18 may comprise any of a wide range of materials and devices now known in the art or that may be developed in the future that are or would be useful for attracting and holding any of a wide variety of debris types. As described herein, the debris attractants 18 may be categorized according to the type of debris and or the particular mechanism that is used to collect the debris. For example, debris attractants 18 may comprise magnetic type debris attractants, displacement type debris attractants, electrostatic type debris attractants, and contact/adhesion type debris attractants. Alternatively, other types of debris attractants and/or categorizations of debris attractants may be used and should be regarded as within the scope of the present invention.

As was briefly described above, magnetic type debris attractants 18 attract (i.e., collect) and hold magnetic debris, such as particles of magnetic materials. In one embodiment, the magnetic type debris attractant 18 may comprise one or more permanent magnets 20, as best seen in FIG. 3. The permanent magnets 20 may be located at any of a wide range of positions on the debris collection apparatus 10 depending on the particular application. For example, it will be desirable to position the magnets 20 at positions where they are likely to attract and collect the maximum magnetic debris, as best seen in FIG. 3.

However, where, as in the example embodiments shown and described herein, the debris collection apparatus 10 is sized to emulate a data cartridge for magnetic media, the magnets 20 should not be located at positions where they may magnetize the read/write heads or other magnetically sensitive components of the cartridge read/write devices 32. Alternatively, the debris collection apparatus 10 should not be moved to those positions in the data storage library 16 wherein the magnets 20 might adversely affect magnetically-sensitive systems or components. For example, if data cartridges 14 having magnetic media will be present in the data storage library 16 at the same time as a debris collection apparatus 10 having a magnetic-type debris attractant 18, it may be desirable to avoid moving the debris collection apparatus 10 to locations where it might corrupt or erase data that may be stored on the magnetic media contained in the data cartridge 14.

The magnets 20 may be operatively associated with the housing 12 in accordance with any of a wide variety of structural arrangements. For example, in one embodiment wherein the debris collection apparatus 10 comprises a housing 12 having two halves 46 and 48 that define a hollow interior region 50, the magnets 20 may be attached to the inside portion of the housing 12, as best seen in FIG. 3. Alternatively, the exterior surfaces of housing 12 may be provided with one or more recessed areas (not shown) sized to receive the magnets 20. Still other mounting arrangements are possible, as would become apparent to persons having ordinary skill in the art after having become familiar with the teachings provided herein and after considering the particular application. Consequently, the present invention should not be regarded as limited to any particular configurations or mounting arrangements for the magnets 20.

Referring now to FIGS. 4-6, the debris attractant 18 may also comprise a displacement type debris attractant. As mentioned, the displacement type debris attractant 18 collects and holds debris primarily by displacing, i.e., removing, debris from surfaces by physical contact. Accordingly, displacement type debris attractants 18 will be particularly advantageous for cleaning (i.e., removing) debris from various contact-type components that may be in the data storage library 16. Such contact-type components include, but are not limited to, cartridge-engaging devices of the cartridge access system 34 that are used to engage and pull the data cartridge 14 from a cartridge holding location 30 or a cartridge read/write device 32. In addition, the cartridge holding locations 20 and/or cartridge read/write devices 32 may also comprise additional components or surfaces that could be cleaned by the displacement type debris attractant 18.

The displacement type debris attractants 18 may comprise any of a wide range of displacement materials 22 now known in the art or that may be developed in the future that are or would be suitable for displacing and removing debris from surfaces and components via a cleaning or wiping action. Examples of displacement type debris attractants 18 include, but are not limited to, felt 24 (FIG. 4), bristles 26 (FIG. 5), and fabric 28 (FIG. 6). Generally speaking, it will be desirable to place the displacement material or materials 22 at locations on the housing 12 of debris collection apparatus 10 where they will be effective in removing and holding debris from surfaces and components that are desired to be cleaned. Consequently, the debris collection apparatus 10 should not be limited to displacement material 22 located at any particular position or positions on the debris collection apparatus 10. However, by way of example, in one embodiment, the displacement material 22 comprising the displacement debris attractants 18 may be positioned at the locations illustrated in FIGS. 4-6.

The displacement material 22 may be operatively associated or affixed to the housing 12 of debris collection apparatus 10 by any of a wide range of methods and configurations. For example, the displacement material 22 may be affixed to the housing 12 via any of a wide range of adhesive materials. Alternatively, the displacement material 22 may be secured to the housing by mechanical means or by any other means now known in the art or that may be developed in the future.

Electrostatic debris attractants 18 utilize the electrostatic attraction between opposite electrostatic charges to hold electrostatically-charged debris. The electrostatic debris attractant 18 may comprise any of a wide variety of non-electrically conductive materials, such as plastics, which will accept and hold a static electric charge. Depending on the particular application and desired construction of the debris collection apparatus 10, the electrostatic debris attractant 18 may be implemented in accordance with any of a wide variety of methods. For example, if the housing 12 of debris collection apparatus 10 is manufactured from a non-electrically conductive plastic material capable of accepting a holding a static electric charge, then the static debris attractant 18 will comprise the entire housing 12 of the debris collection apparatus 10. Alternatively, the static debris attractants 18 could be provided as separate regions on the housing 12, such as would be possible by placing suitable electrostatically-chargeable materials at desired locations on the housing 12. In such an implementation, a single debris collection apparatus 10 could be provided with two separate electrostatically-chargeable regions. The two regions could then be oppositely charged, thereby providing a single debris collection apparatus 10 with the ability to attract and collect both positively- and negatively-charged debris.

Contact/adhesion type debris attractants 18 collect and hold debris that comes into physical contact with the contact/adhesion type debris attractant 18. As mentioned, one type of contact/adhesion type of debris attractant 18 may comprise any of a wide range of polymeric materials having high surface energies associated with van der Waals forces. In many cases, the high surface energies is a result of providing the polymeric material with a high proportion of plasticizer. In such materials, excess plasticizer tends to migrate to the surface of the polymeric material. The plasticizer collects and holds a wide variety of debris types, including dust and even bacteria. Exemplary high energy polymeric materials include, but are not limited to, highly plasticized polyvinylchloride comprising from about 15 wt. % to about 45 wt. % polyvinylchloride and about 55 wt. % to about 85 wt. % plasticizer. The plasticizer may be any substance used to plasticize polyvinylchloride, such as high molecular weight or polymeric plasticizers, such as chain-stopped poly(propylene glycol adipate) or poly(1,3-butane diolazelate) having molecular weights of about 750 to 1250. However, since polymeric materials suitable for use as contact/adhesion type debris attractants are known in the art and could be readily provided by persons having skill in the art after having become familiar with the teachings provided herein, the particular polymeric material that may be utilized in various embodiments of the present invention will not be described in greater detail herein.

Depending on the particular application and desired construction of the debris collection apparatus 10, the contact/adhesion type debris attractant 18 may be implemented in accordance with any of a wide variety of manners. For example, if the housing 12 of debris collection apparatus 10 is manufactured from a high surface energy polymeric material, then the contact/adhesion type debris attractant 18 will comprise the entire housing 12 of the debris collection apparatus 10. Alternatively, the contact/adhesion debris attractants 18 could be provided as separate regions on the housing 12, such as would be possible by placing suitable polymeric materials at desired locations on the housing 12. By way of example, in one embodiment, the two halves 46 and 48 of housing 12 are manufactured from a polymeric material having a high surface energy, thereby allowing the entire housing 12 to function as the contact/adhesion type debris attractant 18.

As noted above, it is not necessary to provide a single debris collection apparatus 10 with all of the various types of debris attractants 18, or even a combination of any two or more types of debris attractants. For example, one embodiment of debris collection apparatus 10 may comprise a housing 12 fabricated from a high surface energy polymeric material, which comprises a contact/adhesion debris attractant 18. Another embodiment may add to this sole debris attractant 18 a permanent magnet or magnets 20 (FIG. 3), in which case the debris collection apparatus 10 will comprise a contact/adhesion debris attractant and a magnetic type debris attractant. Other embodiment may involve other combinations and permutations of debris attractants. Consequently, be selecting various types of debris attractants, various types of debris collection apparatus 10 can be optimized to collect debris of various types.

It should be noted that it is not necessary to provide the debris attractant 18 on a specially configured housing 12 in the manner already described. For example, in an alternative embodiment, one or more debris attractants 18 could be provided on a conventional (e.g., an old, discarded, or no longer functional) data cartridge 14. In still another alternative arrangement, one or more debris attractants 18 could be provided on a head cleaning cartridge of the type that is used to clean the read/write heads of the cartridge read/write device (s) provided in the data storage library 16. In such embodiments, it may be necessary or desirable to update the cartridge identification system of the cartridge (e.g., the conventional data cartridge or head cleaning cartridge) to reflect the fact that the data cartridge may now be used as a debris collection apparatus 10.

Referring now to FIG. 2, debris collection apparatus 10 according to the teachings provided herein may be used to collect and remove debris from a data storage library 16 by providing one or more debris collection apparatus 10 to the data storage library 16. Ideally, the debris collection apparatus 10 provided to the data storage library will be provided with one or more debris attractants 18 to collect and hold the debris desired to be collected. If necessary, a plurality of debris collection apparatus 10 having different types of debris attractants 18 may be provided in order to collect and hold the debris to be collected.

For example, in one embodiment wherein the debris collection apparatus 10 is provided with a contact/adhesive type debris attractant 18, such as, for example, if the housing 12 is fabricated from a high surface energy polymeric material, the debris collection apparatus 10 will tend to attract and hold debris (e.g., dust and wear particles) that comes into contact with the debris attractant 18. Thus, the debris collection apparatus 10 will remove debris from the cartridge access system 34, as well as any cartridge holding locations 30 in which will be inserted the debris collection apparatus 10. Similarly, the debris collection apparatus 10 will collect and remove debris from any cartridge read/write devices 32 into which the debris collection apparatus 10 may be inserted.

Additional debris collection can be achieved by providing the debris collection apparatus 10 with other types of debris attractants 18. For example, magnetic type debris attractants 18, such as one or more permanent magnets 20 (FIG. 3), will allow the debris collection apparatus 10 to collect and hold magnetic debris from regions in proximity to the debris collection apparatus 10. Electrostatically-charged debris can be collected by placing an electrostatic charge or charges on electrostatic debris attractants 18 which may be provided on the debris collection apparatus 10. Placing a positive electrostatic charge on the debris attractant will attract and hold debris having a negative charge. Similarly, placing a negative electrostatic charge on the debris attractant will attract and hold debris having a positive charge.

Displacement material 22 provided on the debris collection apparatus 10 will provide enhanced cleaning (i.e., debris removal) of surfaces and objects that may be contacted by the displacement material 22 as the debris collection apparatus 10 is moved about within the data storage library 16. The careful placement of displacement material 22 (e.g., as illustrated in FIGS. 4-6) on the debris collection apparatus 10 can be used to provide enhanced cleaning of certain portions of the library storage system 16, such as, for example the cartridge engaging mechanism (not shown) provided on the cartridge access system 34.

One or more separate debris collection apparatus 10 may be provided to the data storage library 16 in order to optimally collect and hold several debris types. For example, a first debris collection apparatus having at least a first type of debris attractant may be provided to the data storage library 16. A second debris collection apparatus having at least a second type of debris attractant also may be provided to the data storage library 16. Additional debris collection apparatus may be provided as necessary in order to collect all expected debris types.

The debris collection apparatus 10 may be provided with a suitable cartridge identification system (not shown) to allow various systems or components of the data storage library 16 to identify the debris collection apparatus 10. If multiple debris collection apparatus 10 having different types of debris attractants 18, then the cartridge identification system can be programmed with that information as well, thereby allowing for the possibility of using the various debris collection apparatus 10 to clean those areas of the data storage library 16 for which they are optimized.

The particular cleaning method or regimen that may be used to clean the data storage library 16 may vary depending on a wide range of factors and considerations, as well as on the particular type of data storage library system 16 to be cleaned. Consequently, the present invention should not be regarded as limited to any particular cleaning method or regimen. However, by way of example, in one embodiment, the cleaning regimen may be performed on an empty data storage library (i.e., containing no data cartridges). The data storage library 16 may the be provided with one or more debris collection apparatus 10. The data storage library 16 may be provided with a cleaning program that will cause the cartridge access system 34 to "pick and place" the debris collection apparatus 10 in all of the cartridge storage locations provided in the data storage library 16. This will allow for cleaning of the entire data storage library. If the data storage library 16 is provided with apparatus for identifying the data cartridges (e.g., an RFID system), the data storage library 16 could identify the various types of cleaning cartridges (i.e., debris collection apparatus 10), and move them to the appropriate areas for cleaning. For example, a debris collection apparatus 10 having a magnetic debris attractant 18 could be properly identified and not inserted into a cartridge read/write device 32, if such an action were desired. Similarly, a debris collection apparatus 10 comprising a portion of a conventional head cleaning cartridge could also be identified and used appropriately to both clean the heads of the cartridge read/write device 32 as well as to clean other areas or systems as appropriate for the particular type of debris attractant 18 provided thereon.

In an alternative cleaning arrangement or regimen, the data storage library could be cleaned "on the fly." In one such arrangement, the cartridge access system 34 could move the debris collection apparatus 10 from place to place within the data storage library 16 (e.g., between vacant cartridge storage locations) during idle periods or during programmed cleaning times.

After cleaning, the debris collection apparatus 10 may be removed from the data storage library 16. Thereafter, the various debris attractants 18 provided thereon may be cleaned and/or rejuvenated as necessary. The debris collection apparatus 10 may then be reused.

Figure 7:
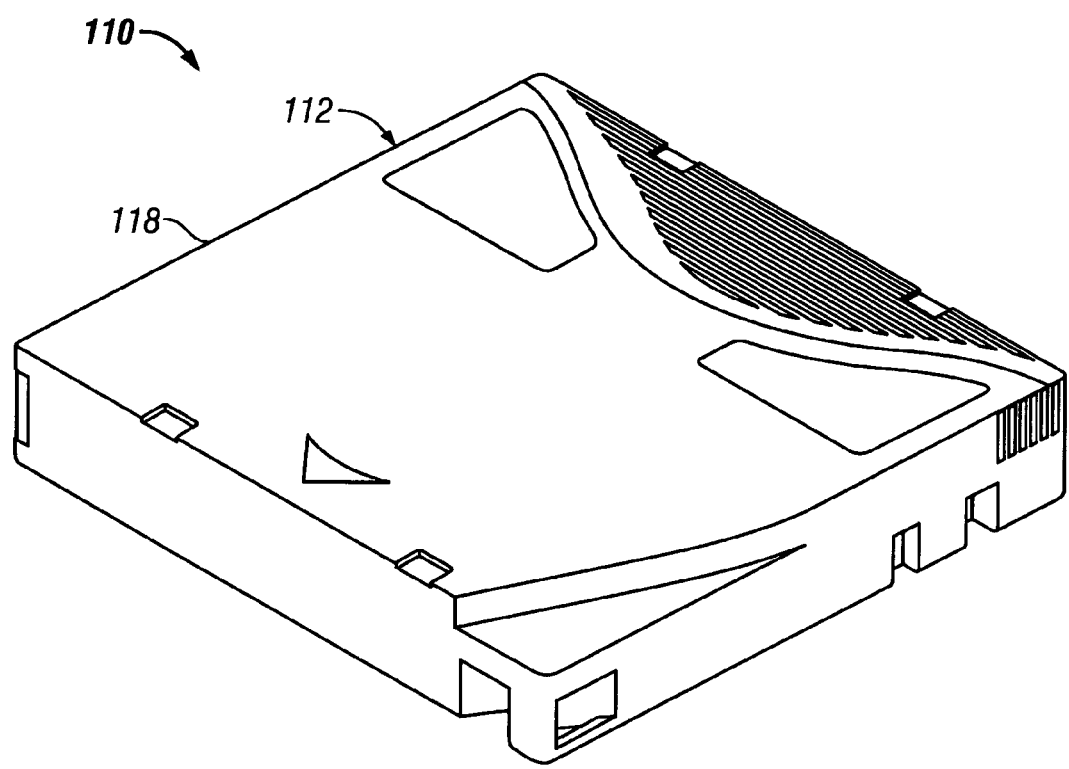
FIG. 7 is a perspective view of another embodiment of debris collecting apparatus.

Another embodiment of debris collection apparatus 110 is illustrated in FIG. 7 and may comprise a polymeric material formed so that the debris collection apparatus 110 substantially conforms to a dimensional standard for a specified type of data cartridge. That is, embodiment 110 does not have a two-piece housing as the first embodiment. Instead, the embodiment 110 comprises a substantially solid structure comprising the polymeric material. The polymeric material has a high surface energy, thereby allowing it to function as a contact/adhesion debris attractant 118. The polymeric material may be provided with a plurality of grooves therein in order to enhance the cleaning ability of the material. Additional debris attractants, such as magnetic, displacement, and electrostatic debris attractants may be added in order to provide the debris collection apparatus with the ability to collect debris of the desired type in the manner already described.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. A debris collection apparatus, comprising:
    a housing for a data cartridge, said housing substantially conforming to a dimensional standard for a specified type of said data cartridge; and
    a debris attractant provided on an external surface of said housing of said data cartridge, said debris attractant attracting and holding debris from a region to be cleaned.

2. The debris collection apparatus of claim 1, wherein said debris attractant comprises one or more selected from the group consisting of magnetic, displacement, electrostatic, and contact/adhesion.

3. The debris collection apparatus of claim 1, wherein said debris attractant is a magnetic debris attractant and comprises at least one permanent magnet.

4. The debris collection apparatus of claim 1, wherein said debris attractant is a displacement debris attractant and comprises one or more selected from the group consisting of felt, bristles, and fabric.

5. The debris collection apparatus of claim 1, wherein said debris attractant is an electrostatic debris attractant and comprises a non-electrically conductive material.

6. The debris collection apparatus of claim 1, wherein said debris attractant is a contact/adhesion debris attractant comprises a polymeric material.

7. The debris collection apparatus of claim 1, wherein said dimensional standard for a specified type of data cartridge is selected from the group consisting of an LTO dimensional standard and a DLT dimensional standard.

8. A debris collection apparatus comprising a polymeric material, wherein the polymeric material has been formed to substantially conform to a dimensional standard for a specified type of data cartridge, said polymeric material attracting and holding debris from a region to be cleaned.

9. The debris collection apparatus of claim 8, further comprising a second debris attractant operatively associated with said debris collection apparatus.

10. The debris collection apparatus of claim 9, wherein said second debris attractant comprises one or more selected from the group consisting of magnetic, displacement, and electrostatic.

11. The debris collection apparatus of claim 9, wherein said second debris attractant is a magnetic debris attractant and comprises at least one permanent magnet.

12. The debris collection apparatus of claim 9, wherein said second debris attractant is a displacement debris attractant and comprises one or more selected from the group consisting of felt, bristles, and fabric.

13. The debris collection apparatus of claim 9, wherein said second debris attractant is an electrostatic debris attractant and comprises a non-electrically conductive material.

14. The debris collection apparatus of claim 8, wherein said dimensional standard comprises an LTO dimensional standard.

15. The debris collection apparatus of claim 1 for use in a data storage library, comprising:
   a plurality of data cartridge holding, locations;
   a cartridge access system operatively associated with said data storage library, said cartridge access system operable to retrieve and move a data cartridge among said plurality of data cartridge holding locations.

\* \* \* \* \*

UNITED STATES PATENT AND TRADEMARK OFFICE
CERTIFICATE OF CORRECTION

PATENT NO. : 8,528,575 B2  
APPLICATION NO. : 11/242203  
DATED : September 10, 2013  
INVENTOR(S) : Robert C. Aaron et al.

Page 1 of 1

It is certified that error appears in the above-identified patent and that said Letters Patent is hereby corrected as shown below:

In the Claims

In column 12, line 15, in Claim 15, delete "holding," and insert --holding--, therefor.

Signed and Sealed this  
Fifth Day of November, 2013

Teresa Stanek Rea  
*Deputy Director of the United States Patent and Trademark Office*